T. J. AND L. H. STURTEVANT.
MIXING APPARATUS.
APPLICATION FILED MAR. 19, 1917.

1,363,823.

Patented Dec. 28, 1920.
4 SHEETS—SHEET 3.

Inventors
Thomas J. Sturtevant and
Laurence H. Sturtevant
by Robt. P. Hains
atty.

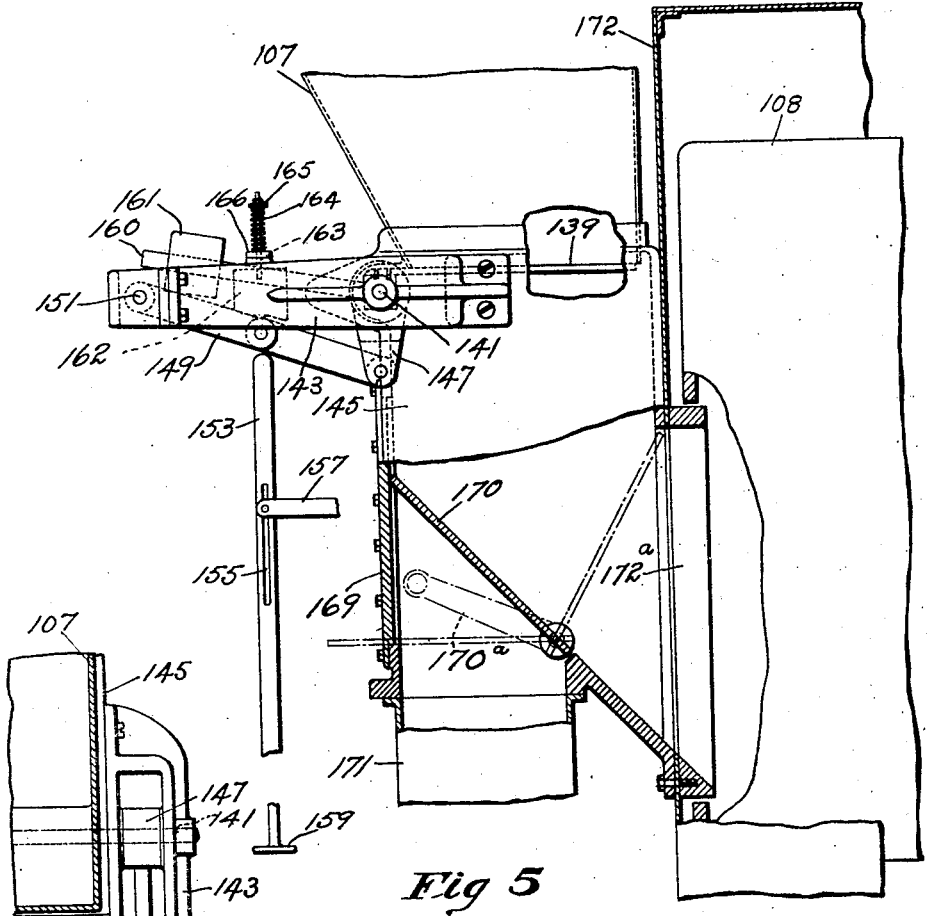

UNITED STATES PATENT OFFICE.

THOMAS J. STURTEVANT, OF WELLESLEY, MASSACHUSETTS, AND LAURANCE H. STURTEVANT, OF TEMPLE, NEW HAMPSHIRE, ASSIGNORS TO STURTEVANT MILL COMPANY, OF BOSTON, MASSACHUSETTS, A CORPORATION OF MASSACHUSETTS.

MIXING APPARATUS.

1,363,823.   Specification of Letters Patent.   Patented Dec. 28, 1920.

Application filed March 19, 1917. Serial No. 155,666.

*To all whom it may concern:*

Be it known that we, THOMAS J. STURTEVANT and LAURANCE H. STURTEVANT, citizens of the United States, and residents of Wellesley county of Norfolk, State of Massachusetts, and Temple, county of Hillsborough, and State of New Hampshire, respectively, have invented an Improvement in Mixing Apparatus, of which the following description, in connection with the accompanying drawings, is a specification, like characters on the drawings representing like parts.

The invention hereinafter described relates to apparatus for preparing fertilizers and other materials for shipment or storage and is an improvement upon the apparatus shown in Letters Patent, No. 1,159,607, granted to L. H. Sturtevant, November 9, 1915.

Broadly, in the apparatus embodying the invention, the fertilizer ingredients may be introduced into an assembly hopper and fed therefrom by a breaker feeder to the bottom of an elevator well. The ingredients are conducted by a bucket chain elevator to the top of this well and delivered by an inclined flaring chute to a separator. The fines pass from the separator into a mixer hopper, while the tailings are conducted through a bypass chute to a pulverizing machine and after being pulverized, are conducted by a chute back to the bottom of the elevator well. They are conducted thence by the elevator up to the separator and the screening operation continues until the entire batch originally introduced into the assembly hopper is reduced to a uniform size and delivered to the hopper of the mixer. Then the batch is admitted to the mixer and thoroughly mixed. It is conducted thence to a second elevator and delivered thereby to a weighing and bagging device.

One object of the invention is to provide the assembly hopper with means for preventing dust from being blown back therethrough by the draft produced by the elevator.

Another object is to provide the chute leading from the elevator to the separator with means for distributing the materials to the separator.

Another object is to provide the mixer hopper with a gate which may be easily opened at times desired and automatically closed after the contents of the hopper have been discharged into the mixer.

Another object is to provide a gate which may serve the triple function of guiding the materials from the mixer hopper to the mixer, by passing the materials from the mixer hopper past the mixer to the second elevator, and serving to admit access to the interior of the mixer for the purposes of inspection and repair.

Another object is to provide means for inclosing and protecting the mixer to prevent the escape of dust therefrom.

Another object is to provide a chute leading from the pulverizer to the first elevator with means whereby iron and other foreign materials may be trapped and removed from the apparatus.

Another object is to provide means for preventing a back-draft through the chute leading from the mixer to the second elevator.

Another object is to provide means whereby the materials may be simultaneously weighed and delivered to a plurality of bags.

And still another object is to provide means whereby fertilizer materials may be kept continually in motion to prevent the same from hardening during periods of interruption of the weighing and bagging operations.

The character of the invention will be best understood by reference to the following description of one good form thereof shown in the accompanying drawings, wherein:—

Figure 3:
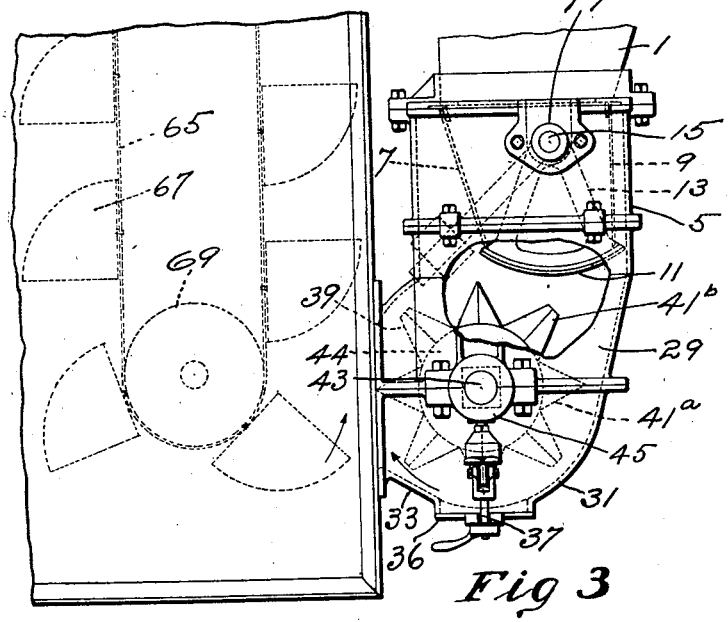
Figure 4:
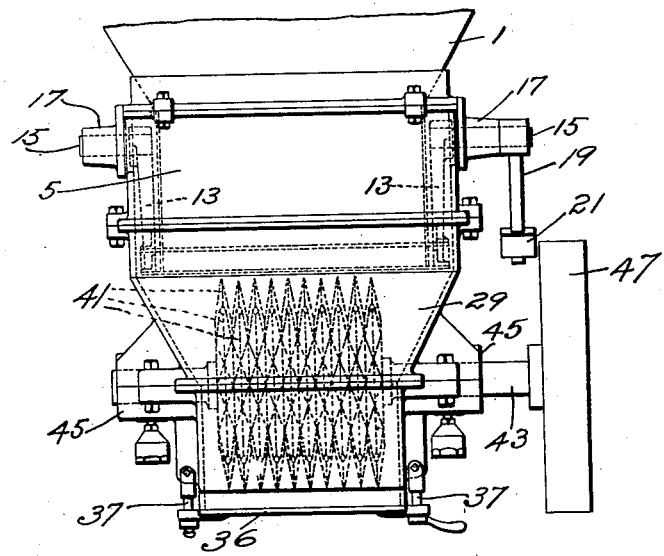

Fig. 3 on an enlarged scale, is an end elevation of the assembly hopper and the breaker feeder;

Fig. 4 is an end elevation of the parts shown in Fig. 3;

Fig. 5 on an enlarged scale, is a view partly in side elevation and partly in section, of portions of the mixer hopper, the mixer, the gate for the hopper, and the three-function gate for the mixer;

Fig. 6 is a view partly in plan and horizontal section of parts shown in Fig. 5;

Fig. 7 is a plan of the chute leading from the top of the first elevator to the separator and illustrating the means for spreading and distributing the materials to the separator; and Fig. 8 is a side elevation of a portion of the chute shown in Fig. 7.

Referring to the drawings: The apparatus shown therein as embodying the invention comprises an assembly hopper 1 into which the ingredients of the fertilizer or other material to be prepared in readiness for shipping is dumped. Preferably, the hopper is mounted in a pit beneath the floor 3 so that the mouth of the hopper is flush therewith. To control the delivery from the hopper, it is provided with a depending neck 5 provided with a box therein having walls 7 and 9 for directing the material toward one side of said neck.

At the bottom of this neck is a gate 11 preferably curved in form and adapted to swing from its closed position shown in Fig. 3 to an open position where it will occupy the space between the box wall 7 and the wall of the neck adjacent thereto. To permit these movements of the gate it may be connected by arms 13 with shafts 15 fulcrumed in boss bearings 17. An arm 19 has a hub fast on one end of this shaft, and carries a weight 21 which tends to maintain the gate in its closed position as shown in Fig. 3. To open the gate, said arm may be connected to a chain 22 which is led upward and over a guide pulley 23. An end of this chain depends from said pulley and is provided with a handle 25 conveniently accessible to an operator on a floor 27 above the floor 3 referred to.

To conduct the materials from the neck to the bottom of the well of the elevator, a casing 29 is provided having a curved wall 31 with an inner delivery portion 33 inclined upward somewhat, as will be noted in Fig. 3. To furnish access to this casing, its bottom may be provided with a door 36 adapted to be secured in closed position by swing bolts 37.

The fertilizer ingredients tend to form lumps therein, and lack uniformity of character when delivered into the assembly hopper. To break up these lumps and feed the materials uniformly to the elevator, a breaker feeder 39 (Figs. 3 and 4) is provided, and comprises a series of strong teeth 41 on disks 44 on a square portion of a shaft 43 journaled in bearings 45 in the casing. At one end of this shaft is a pulley 47 adapted to be driven by a belt 49 from a pulley 51 on a counter shaft 53. A second pulley 55 on this shaft is driven by a belt 57 from a pulley 59 fast on the main shaft 61 journaled in bearings in brackets 63 suitably supported.

The teeth of the breaker coöperate with the wall of its casing to crush, break up and regulate the flow of the materials from the hopper to the elevator.

The teeth of the breaker include alternate, sharp-pointed teeth 41$^a$ and broader, blunt teeth 41$^b$, the construction being such that a substantial toothed surface is provided to produce a blower effect and create a draft in the direction of the arrow shown in Fig. 3 upward in the elevator well, and substantially preventing the blowing of dust from the well back through the breaker casing and hopper from the draft produced by the traveling of the buckets in the elevator well.

The elevator well 64 may be of sheet metal, and made tight so as to prevent escape of dust therefrom. The elevator comprises the usual chain 65 and buckets 67 thereon, the chain being guided about a lower wheel 69 and an upper wheel 71. The latter is mounted on a shaft 73 having a gear 75 thereon driven by a pinion 77 on a shaft 79. This shaft has a pulley 81 thereon driven by a belt 83 from a pulley 85 fast on the main shaft referred to.

To permit access to the interior of the elevator well for purposes of inspection or repair, it may be provided with a door 86$^a$ at the lower end thereof, and a door 86$^b$ at the upper end thereof.

The materials are conducted by this elevator from the assembly hopper to the chute 87 which delivers the materials from the top of the elevator to the separator 88. This chute may be made of sheet material tightly constructed to prevent escape of dust therefrom, and flares downward as will be noted in Fig. 7, to conform to the width of the separator.

To deflect and distribute the materials in their transit from the elevator through the chute to the separator, the chute may be provided with a pair of long deflectors 89 and shorter central deflectors 91.

To furnish access to the interior of the chute, it may be provided with a door 93 hinged to the upper wall thereof.

The separator 95 may be the well-known Sturtevant or Newaygo separator, comprising a casing containing an inclined screen and provided with devices for percussively jarring the screen. These devices may be operated by sprocket wheels 97 and chains 99 driven by a pulley 101 at the top of the separator, the latter pulley in turn being driven by a belt 103 from a pulley 105 fast on the main shaft referred to.

The fines from the material separated will pass through the screen down into a hopper 107 leading to the mixer 108, while the tailings will pass over the upper surface of the screen and be conducted by a chute 109 to a pulverizing machine 111, preferably of the swinging hammer type such as shown in Letters Patent No. 686,364. The pulverizing machine is provided with a shaft 113 having a pulley 115 thereon driven by a belt 117 from a pulley 119 fast on the main shaft.

The tailings, after being thoroughly pulverized in this machine, are conducted by a chute 121 back to the base of the elevator.

To eliminate iron and other foreign materials from the fertilizer, the chute 121 may be provided with a gate 123 on a shaft provided with an arm 127 carrying a weight 129, the latter serving to normally close said gate. To open the gate, a chain 131 is connected to said arm and conducted upward over a guide pulley 133 mounted on the elevator well. An end of this chain hangs down from the pulley and is provided with a handle 135 adjacent the assembly hopper gate controlling handle referred to, and is conveniently accessible to the operator.

A swing valve 137 having a handle 138 may be provided in the chute 121 adjacent the gate thereof to check the passage of materials therethrough, and to prevent back draft through the chute.

The valve may be held closed and the chute may be opened from time to time to permit escape from the chute of any foreign materials in the fertilizer.

The tailings, after being pulverized and conducted to the bottom of the elevator well, are lifted by the elevator up to the inclined chute 87 and delivered again to the separator which grades the same and delivers the fines to the mixer hopper. The process will be continued until all of the materials of the batch have been reduced in size so as to pass through the screen of the separator and into the mixer hopper. Then the batch should be discharged from the mixer hopper into the mixer. To control the discharge from this hopper, it is provided with a gate 139, Fig. 5, fast on a shaft 141 journaled in bearings in a bracket 143 on a casing 145 connecting the hopper with the mixer.

To open and close said gate, said shaft is provided with an arm 147 depending therefrom, connected by a toggle 149 with a pin 151 mounted in the outer end of the bracket. The construction is such that when the toggle is straightened, the gate is held closed, but when the toggle is buckled upward, the gate is opened.

To buckle the toggle to open the gate, an upright rod 153 is provided having a slot 155 intermediate the ends thereof guided by an arm 157 fast on said casing 145. The lower end of this rod is pivotally connected to a treadle 159 fulcrumed intermediate its ends on the framework for the mixer. The upper free end of the rod is adjacent the point of connection of the links of the toggle, so that when the treadle is depressed, the rod will be thrust upward and engage the toggle, thereby throwing the links thereof out of alinement. The weight of the materials in the mixer hopper will then press the gate downward and permit the contents of the hopper to flow through the casing.

After the contents of the hopper have been discharged, the gate is automatically closed. To accomplish this in the present instance of the invention, the gate may be provided with an arm 160 having a weight mounted thereon and one of the links of the toggle may have a weight 162 thereon. The mass of these weights is less than the mass of the material to be discharged from the hopper, consequently, the material will be effective to overcome the weights and complete the buckling of the toggle after buckling is initiated by depressing of the treadle, as described. To cushion the straightening movement of the toggle, vertical rods 163 may be connected to the weight 162 and be provided with helical springs 164 encircling the same and confined between collars 165 fast on their upper ends and a strip 166 on the top of the bracket. These springs tend to buckle the toggle upward and therefore cushion the straightening movement of the toggle by the weights.

Figure 2:
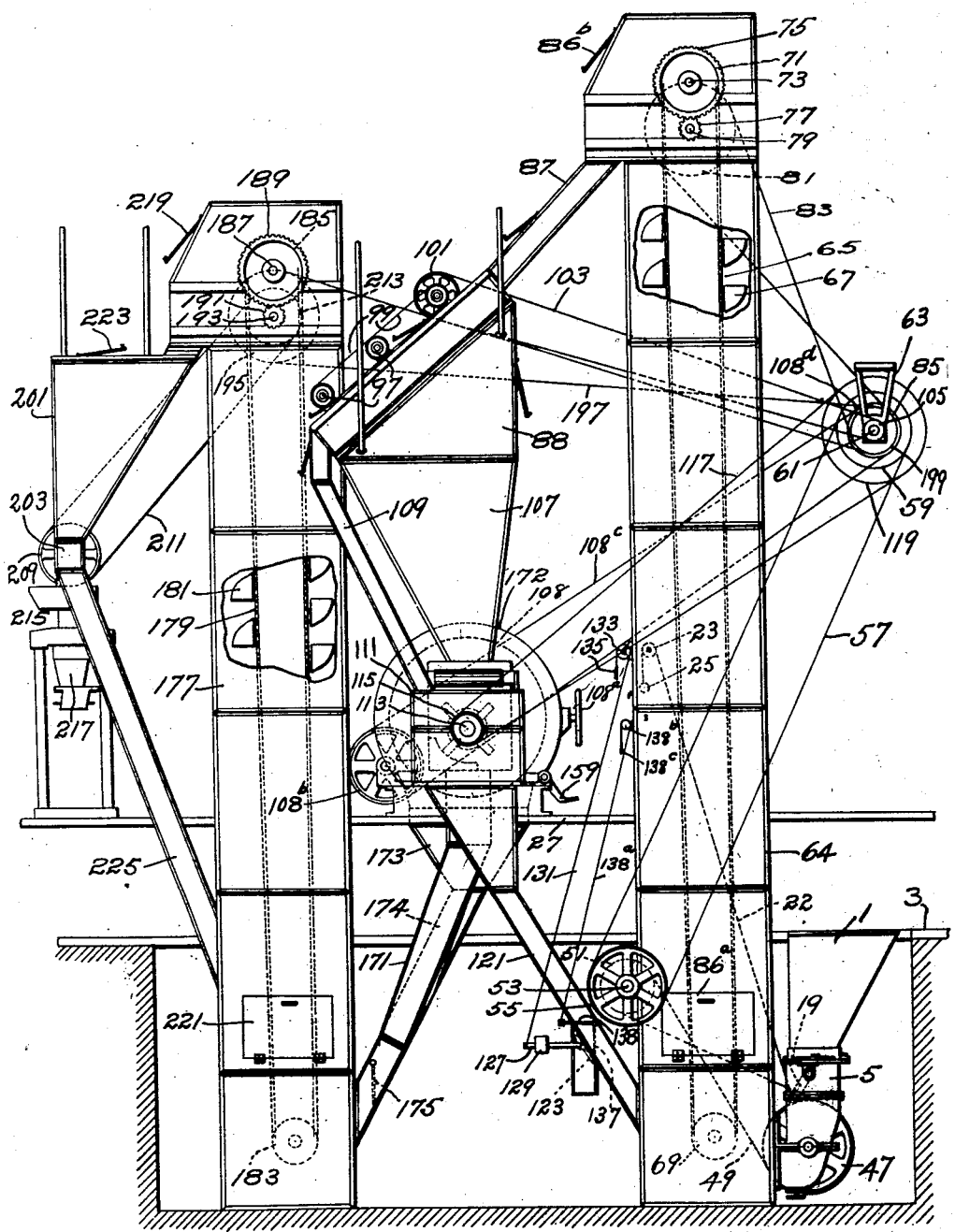
Fig. 2 is a side elevation of the apparatus shown in Fig. 1.

The treadle for buckling the toggle, it will be noted from Fig. 2, is located just above the floor 27 where it is conveniently accessible to the same operator who actuates the chains for controlling the assembly hopper gate and the gate in the chute leading from the pulverizer to the bottom of the elevator.

The materials may be conducted from the hopper to the mixer through the casing 145 which may have an outlet registering with the mixer inlet. A door 169 may be detachably connected by bolts to said casing opposite said outlet. A gate 170 may be mounted in said casing and be rocked by a handle 170$^a$ to three different positions. In its full line position (Fig. 5) it will deflect the material from the hopper to the mixer. When rocked to the left to a horizontal position it will permit access to the mixer through the casing door. And when rocked to the right it will close the mixer inlet and permit the materials to be delivered from the hopper to a bypass chute 171 as more fully hereinafter described.

The materials, after passing from the hopper, are thoroughly mixed in the mixing machine, which may be of the well-known Sturtevant or Hunso type.

Heretofore, considerable difficulty has been experienced from the escape of dust from the mixer. The character of the materials operated upon in this machine is such that this dust is very trying to the operative. Furthermore, it is important to prevent escape of all dust from the apparatus, in order that the desired proportions of the ingredients of the materials may be retained. To prevent escape of this dust from the mixer, it may be completely incased in a dust-tight casing 172, Figs. 1, 2 and 5, which will effectively prevent the objectionable escape of dust therefrom.

Figure 1:
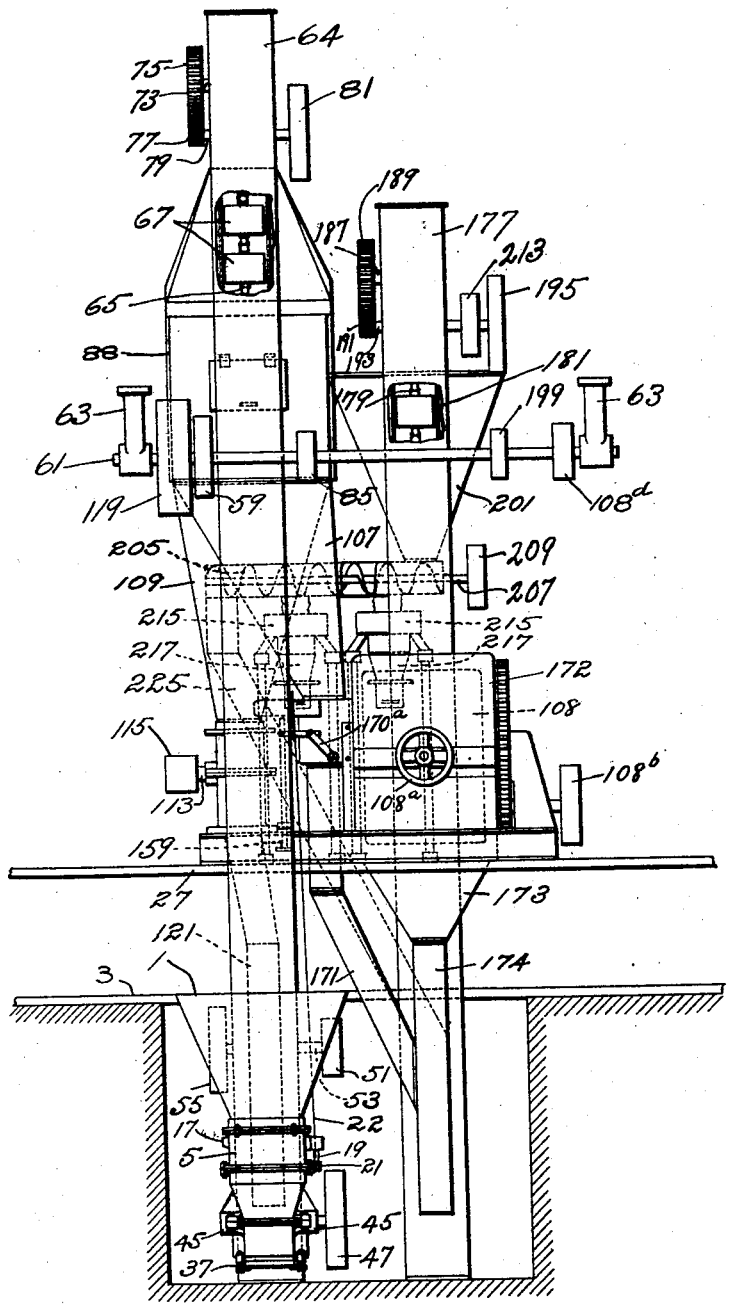
Figure 1 is an end elevation of the apparatus shown herein as embodying the invention.

The hopper casing, Figs. 1 and 5, may have a collar 172$^a$ secured thereto projecting through an opening in the dust-proof casing and into the inlet of the mixer. The marginal portion 172$^b$ of the dust-proof casing surrounding said opening may extend between and be bolted to the hopper casing and said collar.

After the materials have been thoroughly mixed, they are discharged from the mixer, and to accomplish this, the latter is provided with a hand-wheel 108$^a$ which will open the discharge gates of the mixer in the usual manner. This control for the outlet of the mixer, it will be noted, is located adjacent the handles of the chains, and the treadle referred to, so that all of these devices may be actuated by the same operator. The mixer may be driven by a pulley 108$^b$ connected by a belt 108$^c$ with a pulley 108$^d$ on the main shaft.

The materials are delivered from the mixer into its dust-proof casing and gravitate into a hopper 173 at the bottom of said casing communicating with an inclined chute 174 leading to the bottom of the well of a second elevator. This chute may be provided with a valve 175 to prevent backdraft through the chute from the elevator.

The second elevator may be similar to the one already described, and comprises a tight casing 177 containing the usual chain 179 provided with buckets 181, the chain being guided by a lower wheel 183 and an upper wheel 185. The latter wheel is mounted on a shaft 187 having a gear 189 fast thereon and driven by a pinion 191 fast on a shaft 193 having a pulley 195 thereon driven by the belt 197 from a pulley 199 fast on the main shaft referred to.

The materials are delivered by this elevator to a hopper 201 leading to the usual weighing and bagging apparatus.

To permit materials to be delivered simultaneously to a plurality of weighing and bagging machines, the hopper 201 may deliver its contents to a horizontal conduit 203 containing a screw conveyer 205 on a shaft 207 having a pulley 209 thereon driven by a belt 211 from a pulley 213 fast on the shaft 193 in the transmission for the upper pulley of the elevator.

The conduit is shown arranged to deliver material to a pair of weighing machines 215 and their bagging devices 217, although it will be understood that the length of the conduit may be varied and any number of weighing machines and bagging devices may be provided, as desired.

The second elevator may have doors 219 and 221 adjacent the top and bottom thereof and the hopper leading to the weighing and bagging devices may have a door 223 on the top thereof to permit access to these parts for purposes of cleaning or repair.

Certain fertilizers will harden almost instantly if permitted to remain at rest. To keep such fertilizers in motion in case the weighing and bagging operations are interrupted for any reason, a chute 225 may be provided connecting the conveyer conduit with the second elevator. By this construction, the materials may be maintained in continuous motion. They will be elevated by the elevator, discharged into the hopper, fed by the screw conveyer to the chute, and conducted by the chute back to the elevator.

The apparatus is shown herein as provided with two elevators, but in some cases a single and taller elevator is preferably employed. If, in such an elevator, it is desired to keep the materials continuously in motion to prevent hardening thereof, the chute shown herein as leading from the mixer to the second elevator may be adjusted to return the materials to the first elevator. With this arrangement, the materials will be conducted by the elevator to the inclined chute leading to the separator, and both the inlet and discharge gates for the mixer being open, the materials may readily pass therethrough back to the elevator, and the motion of the material through this circuit may be maintained as long as desired.

In some cases it is desired to elevate, and screen materials without mixing the same; and to accomplish this, the bypass chute 171 referred to leading from the mixer hopper is connected to the chute leading from the mixer to the second elevator and the gate at the entrance to the mixer is swung over to its right-hand position shown in dotted line position in Fig. 5. After the entire batch has been graded and fed into the mixer hopper, the gate therefor is opened by buckling its controlling toggle, as described, thereby permitting the contents of the hopper to discharge into the bypass chute to the second elevator. It is then lifted by the latter to the hopper and discharged into the weighing and bagging devices.

From the foregoing description, the operation of the apparatus will be readily understood. The fertilizer ingredients are dumped into the assembly hopper, which, for example, may have a ton capacity. Then the operator on the platform above the floor pulls the chain for opening the hopper gate. This will permit the materials in the hopper to gravitate down to the breaker feeder. The latter will break up the lumps in the materials and uniformly feed the same to the bottom of the well of the first elevator. The materials are lifted by this elevator and dumped into the chute leading to the separator. The fines passing through the screen of the separator, fall into the mixer hopper and are temporarily retained there while the tailings pass down the chute leading to the pulverizer where they are reduced, and then delivered through the chute back to the bottom of the first elevator. The presence of any iron or other foreign materials may be detected by their sound in the chute and eliminated by the opening of the gate in the chute by means of the same operator who controls the assembly hopper gate. The pulverized tailings are conducted by the elevator back to the separator and the operations are continued until the entire batch is discharged into the mixer hopper. Then the operator presses the treadle which buckles the toggle for locking the mixer hopper gate. The weight of the materials on the latter causes it to swing open, thereby delivering the hopper contents into the casing beneath the same at the entrance to the mixer. The gate at the mixer entrance having been adjusted to its full line position shown in Fig. 5, the materials will be directed into the mixer. After the mixer has rotated a short time and the materials have become thoroughly mixed, the outlets are opened by the hand-wheel which is controlled by the same operator who controls the assembly hopper gate, the chute gate, and the treadle.

The materials pass circumferentially from the mixer into the dust-tight casing inclosing the same; thence downward into the hopper at the bottom of said casing, and through the inclined chute leading to the bottom of the second elevator. They are lifted by the latter and discharged into the hopper leading to the weighing and bagging devices. If more than one weighing and bagging device is employed, the materials are conducted by the screw conveyer to these devices and any materials in excess of the amount required for these devices is returned through the chute back to the elevator.

The gate for the mixer hopper automatically closes itself promptly upon the completion of the discharge of the materials therefrom. Upon the occurrence of this event, the operator opens the gate to the assembly hopper and a second batch is passed through the apparatus. Thus, while in a sense the machine is an intermittent apparatus, yet the close sequence of the passage of the successive batches through the apparatus makes it practically continuous in operation.

If it is desired to convey the separated and mixed materials to storage instead of weighing and bagging the same, the chute leading from the mixer may deliver to wheel barrows or to an endless carrier, as specified in Letters Patent referred to above.

The apparatus described is susceptible of great flexibility of operation. It may rapidly mix, weigh, and bag fertilizers; it may mix fertilizers preparatory to their storage; it may re-mix, weigh, and bag fertilizers; it may screen, weigh, and bag stored fertilizers without further mixing; it may simultaneously weigh and deliver to a plurality of bags; and it may maintain fertilizers continuously in motion if the weighing and bagging operations are interrupted, thereby preventing the fertilizers from hardening.

The operator is unable to see the interior of the mixer hopper and therefore is unable to see when the materials are discharged therefrom. To enable the batches of materials to follow one another in close sequence without loss of time, the assembly hopper gate should be opened immediately after the materials have been discharged from the mixer hopper. The automatic closing of the mixer hopper gate serves desirably as an indicator to signal to the operator that the contents of the mixer hopper are discharged and that the assembly hopper gate should be promptly opened to permit the next batch to be passed through the apparatus.

The various instrumentalities constituting the apparatus are constructed so as to render the same dust-tight. The effectiveness of the apparatus against the escape of dust is materially contributed to by the dust-proof casing for the mixer, and the construction and arrangement of the breaker feeder mechanism which prevents backdraft from the elevator through the assembly hopper.

The distribution of the doors throughout the apparatus renders the various instrumentalities thereof conveniently accessible for the purposes of cleaning and repair.

It will be understood that the invention is not limited to the specific embodiment shown, but that various deviations may be made without departing from the spirit and scope of the invention defined in the appended claims.

What is claimed is:—

1. In an apparatus for reducing and mixing materials in batches, the combination of an elevator, a supply hopper for delivering materials thereto, a gate for retaining in said hopper a batch of materials to be mixed, a separator for receiving the materials from said elevator and grading the same, a mixer for the fines delivered from said separator, a normally closed hopper for retaining the fines to be delivered to the mixer, a pulverizer for the tailings delivered from said separator, means for conducting the materials from the pulverizer back to the elevator, means for indicating when the batch of materials has passed from the hopper into the mixer, and manually operable means for opening said gate to deliver the batch from the supply hopper to the elevator.

2. In an apparatus for reducing and mixing materials in batches, the combination of an elevator, a supply hopper for delivering materials thereto, a gate for retaining in said hopper a batch of materials to be mixed, a separator for receiving the materials from said elevator and grading the same, a mixer for the fines delivered from said separator, a normally closed hopper for retaining the fines to be delivered to the mixer, a pulverizer for the tailings delivered from said separator, means for conducting the materials from the pulverizer back to the elevator, manually operable means for admitting the materials from the hopper to the mixer, said manually operable means being constructed to close automatically after discharge of materials from the hopper, and manually operable means for opening the gate to deliver a batch from the supply hopper to the elevator.

3. In an apparatus for reducing and mixing materials in batches, the combination of an elevator, a hopper for delivering materials thereto, a gate for retaining in said hopper the next batch of materials to be mixed, a separator for receiving the materials from said elevator and grading the same, a mixer for the fines delivered from said separator, a pulverizer for the tailings delivered from said separator, means for conducting the materials from the pulverizer back to the elevator, means for indicating when the batch of materials has entered the mixer, and manually operable means for opening said gate to deliver said next batch to the elevator.

4. In an apparatus for reducing and mixing materials in batches, the combination of an elevator, a hopper for delivering materials thereto, a gate for retaining in said hopper the next batch of materials to be mixed, a separator for receiving the materials from said elevator and grading the same, a mixer for the fines delivered from said separator, a pulverizer for the tailings delivered from said separator, means for conducting the materials from the pulverizer back to the elevator, a normally closed gate for controlling the entrance to said mixer constructed to close automatically upon the passage of the accumulated batch of materials past the same, and means for opening the first mentioned gate to deliver said next batch to the elevator.

5. In an apparatus for mixing and bagging materials, a mixer, an elevator for receiving the materials from the mixer, a plurality of weighing and bagging units communicating with the upper portion of the elevator, means for conducting the material from the elevator to said units including a screw conveyer for positively feeding the materials to said units, and means for conducting the excess of materials delivered to the weighing and bagging units back to the elevator.

6. In an apparatus for elevating and mixing materials, the combination of an elevator, a separator for grading materials delivered from said elevator, a mixer and a pulverizer for receiving the fines and tailings respectively from said separator, and means for maintaining the materials discharged from the mixer in motion to prevent the same from hardening, comprising an elevator for receiving materials from the mixer, a plurality of weighing and bagging units communicating with the upper portion of the elevator, means for conducting the materials from the elevator to said units including a screw conveyer for positively feeding the materials to said units, and means for conducting the excess of materials delivered to the weighing and bagging units back to the elevator.

7. In an apparatus for elevating and mixing materials, the combination of an elevator comprising an endless carrier having buckets thereon, a well containing the carrier and buckets, a hopper communicating with the lower portion of said well, a rotary breaker feeder in said hopper provided with relatively sharp teeth for breaking up the materials and with relatively blunt teeth constructed to create a draft directed into the well to prevent back-draft from the buckets through the hopper, and a curved wall inclosing the rotary breaker feeder and coöperating therewith to produce said draft.

8. In an apparatus for reducing and mixing materials in batches, the combination of an elevator, a separator for grading materials delivered from the elevator, a mixer for receiving fines from the separator, a pulverizer for crushing the tailings from the separator and returning them to the elevator, and a dust-proof casing inclosing said mixer and constructed to have the materials delivered thereto upon the completion of the mixing operation.

9. In an apparatus for elevating and mixing materials, the combination of an elevator, a separator for grading materials delivered from the elevator, a mixer for receiving fines from the separator, a by-pass adjacent said mixer, and a gate movable to one position for admitting materials to the mixer, movable to a second position for admitting materials to the by-pass, and movable to a third position to permit access to the mixer.

10. In an apparatus for elevating and mixing materials, the combinaton of an elevator, a hopper for delivering materials thereto, a gate for controlling the passage of materials through said hopper, a separator for receiving the materials from said elevator and grading the same, a mixer for the fines delivered from said separator, a gate for controlling the admission of materials to the mixer, a pulverizer for crushing the tailings from the separator and returning them to the elevator, a gate located between the pulverizer and elevator for permitting escape of foreign materials, and manually operating means accessible from a single point for controlling each of said gates.

11. In an apparatus for elevating and mixing materials, the combination of an elevator, a separator for grading materials delivered from said elevator, a mixer and a pulverizer for receiving the fines and tailings respectively from said separator, a chute for conducting the pulverized material from said pulverizer back to said elevator, and automatically operating valve means in said chute to prevent back-draft from said elevator to said chute.

12. In an apparatus for elevating and mixing materials, the combination of an elevator, a separator for grading materials delivered from said elevator, a mixer and a pulverizer for receiving the fines and tailings respectively from said separator, a chute for conducting the pulverized material from said pulverizer back to said elevator, means intermediate the ends of said chute to permit escape of foreign materials from said chute, and manually operable control means therefor.

13. In an apparatus of the character described, the combination of an elevator, a separator to grade materials delivered from the elevator into fines and tailings, a mixer for the fines, and means alternatively to deliver the materials to the mixer or by-pass the materials from the separator back to the elevator, that the materials may be kept continuously in motion to prevent hardening thereof.

14. In an apparatus of the character described, the combination of an elevator, a separator to grade materials delivered from the elevator into fines and tailings, a mixer for the fines, a pulverizer for the tailings, a weighing and bagging device, and means alternatively to deliver the materials to the weighing and bagging device or keep the same in motion to prevent hardening of the materials.

15. In an apparatus of the character described, the combination of an elevator, a separator to grade materials delivered from the elevator, a mixer for the finer materials, a pulverizer for the coarser materials, means to return the pulverized materials to the elevator that they may be elevated to the separator, a plurality of delivering devices and means including a screw conveyer for feeding the materials to the delivering devices.

In testimony whereof, we have signed our names to this specification.

THOMAS J. STURTEVANT.
LAURANCE H. STURTEVANT.